(12) United States Patent
Binder et al.

(10) Patent No.: US 8,496,147 B2
(45) Date of Patent: Jul. 30, 2013

(54) ROOF RACK SYSTEM FOR A MOTOR VEHICLE

(75) Inventors: Hans Binder, Böhmenkirch (DE); Ottmar Binder, Böhmenkirch (DE)

(73) Assignee: Hans und Ottmar Binder GmbH Oberflachenveredelung, Bohmenkirch (DE)

(*) Notice: Subject to any disclaimer, the term of this patent is extended or adjusted under 35 U.S.C. 154(b) by 1414 days.

(21) Appl. No.: 11/663,568

(22) PCT Filed: Sep. 21, 2005

(86) PCT No.: PCT/EP2005/010201
§ 371 (c)(1), (2), (4) Date: Mar. 23, 2007

(87) PCT Pub. No.: WO2006/032476
PCT Pub. Date: Mar. 30, 2006

(65) Prior Publication Data
US 2007/0194069 A1    Aug. 23, 2007

(30) Foreign Application Priority Data

Sep. 24, 2004  (DE) .......................... 10 2004 047 565
Oct. 15, 2004  (DE) .......................... 10 2004 050 966

(51) Int. Cl.
*B60R 9/04* (2006.01)
(52) U.S. Cl.
USPC .................. 224/326; 224/309; 224/557
(58) Field of Classification Search
USPC ............... 224/309, 325–326, 557; 411/369, 411/371.2, 372, 400, 401; 403/314, 374.3, 403/409.1
See application file for complete search history.

(56) References Cited

U.S. PATENT DOCUMENTS

| 2,643,904 | A | * | 6/1953 | Wehmanen | 411/542 |
| 3,153,971 | A | * | 10/1964 | Lovisek | 411/371.1 |
| 3,325,067 | A | * | 6/1967 | Helm | 224/321 |
| RE27,085 | E | * | 3/1971 | Weidner | 411/371.1 |
| 4,292,876 | A | * | 10/1981 | De Graan | 411/542 |
| 4,767,040 | A | * | 8/1988 | Miller et al. | 224/326 |
| 5,662,444 | A | * | 9/1997 | Schmidt, Jr. | 411/369 |
| 5,791,536 | A | * | 8/1998 | Stapleton | 224/321 |
| 5,865,583 | A | * | 2/1999 | Krawczak et al. | 411/369 |
| 6,378,747 | B1 | * | 4/2002 | Fisch et al. | 224/326 |
| 6,457,926 | B1 | * | 10/2002 | Pope | 411/401 |
| 7,182,233 | B1 | * | 2/2007 | Graffy et al. | 224/326 |

FOREIGN PATENT DOCUMENTS

| DE | 1911802 | 3/1965 |
| DE | 3123106 A1 | 12/1982 |
| DE | 3626926 | 2/1988 |
| DE | 8621340 U1 | 7/1989 |
| DE | 4418528 | 6/1995 |
| DE | 10239022 A1 | 3/2004 |
| DE | 10304016 | 8/2004 |
| DE | 10337202 | 3/2005 |
| EP | 0780267 A | 6/1997 |
| FR | 2 832 369 A | 5/2003 |
| JP | 58194642 A | 11/1983 |

* cited by examiner

*Primary Examiner* — Nathan J Newhouse
*Assistant Examiner* — John Cogill

(57) ABSTRACT

A roof rack system for a motor vehicle, specifically for a passenger car, having at least one roof rack has an attaching device for location on the roof of the vehicle. The attaching device has at least one mounting bolt to pass through at least one roof opening. A seal allocated to the mounting bolt extends around the mounting bolt and rests on the roof with the roof rack installed and thereby surrounds the roof opening.

33 Claims, 5 Drawing Sheets

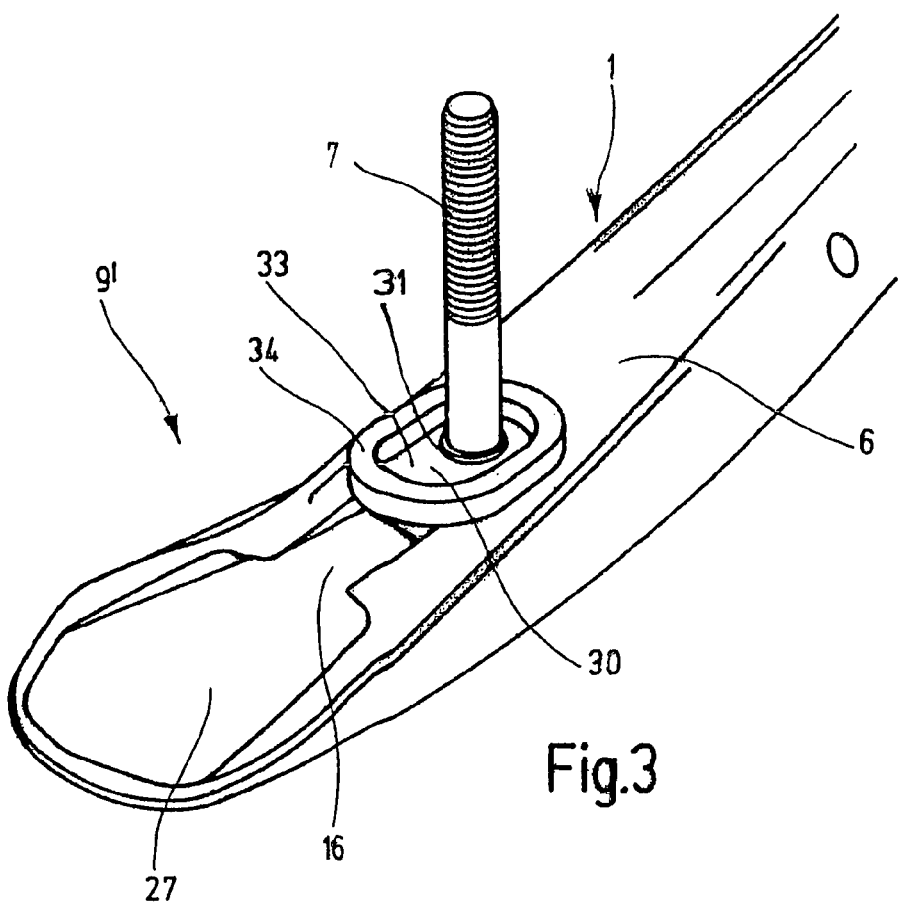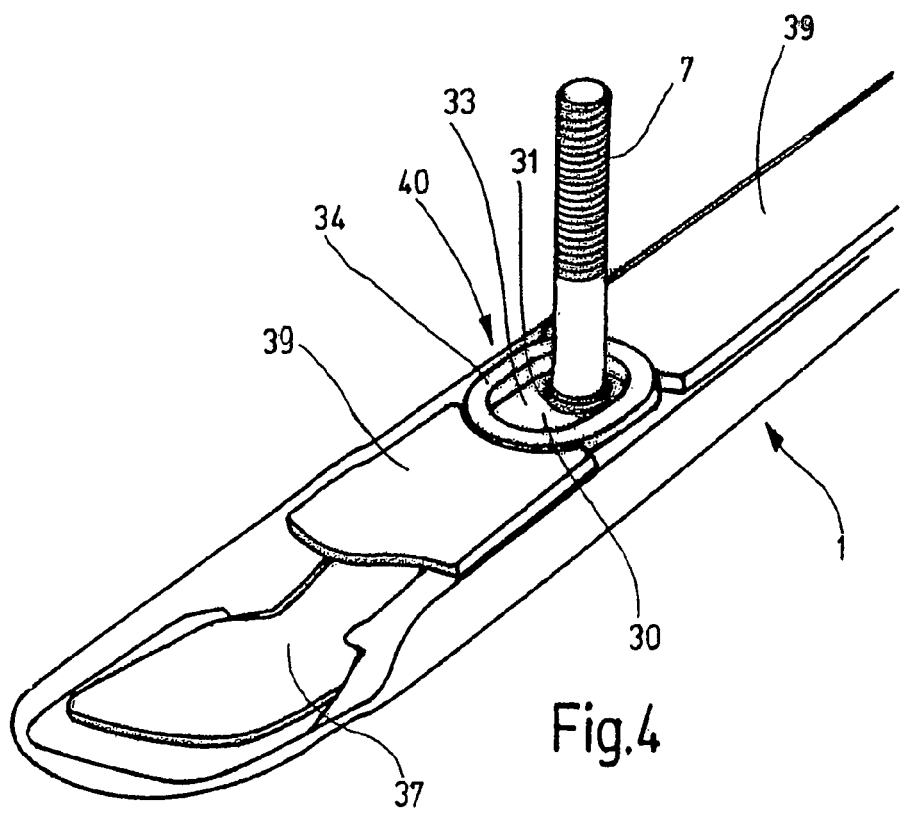

Figure 1:
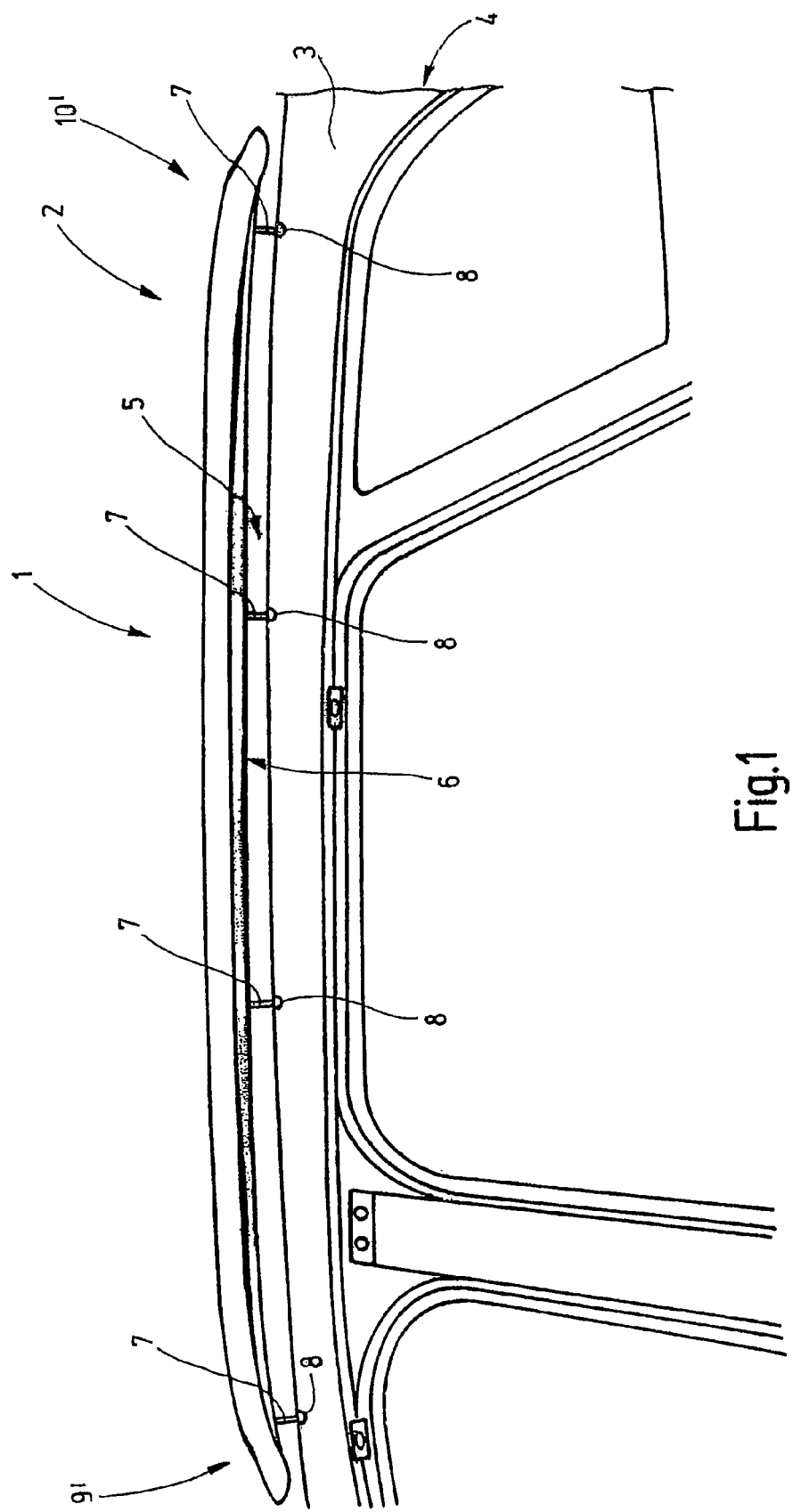

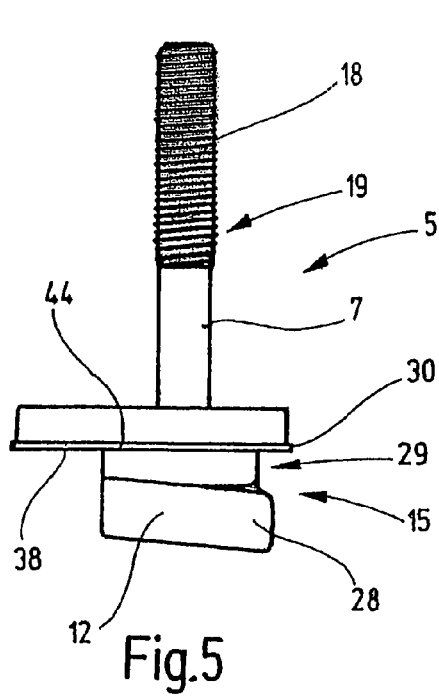
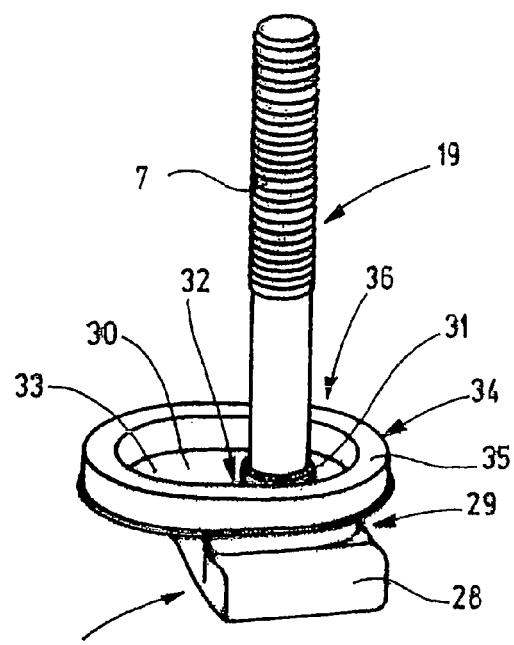
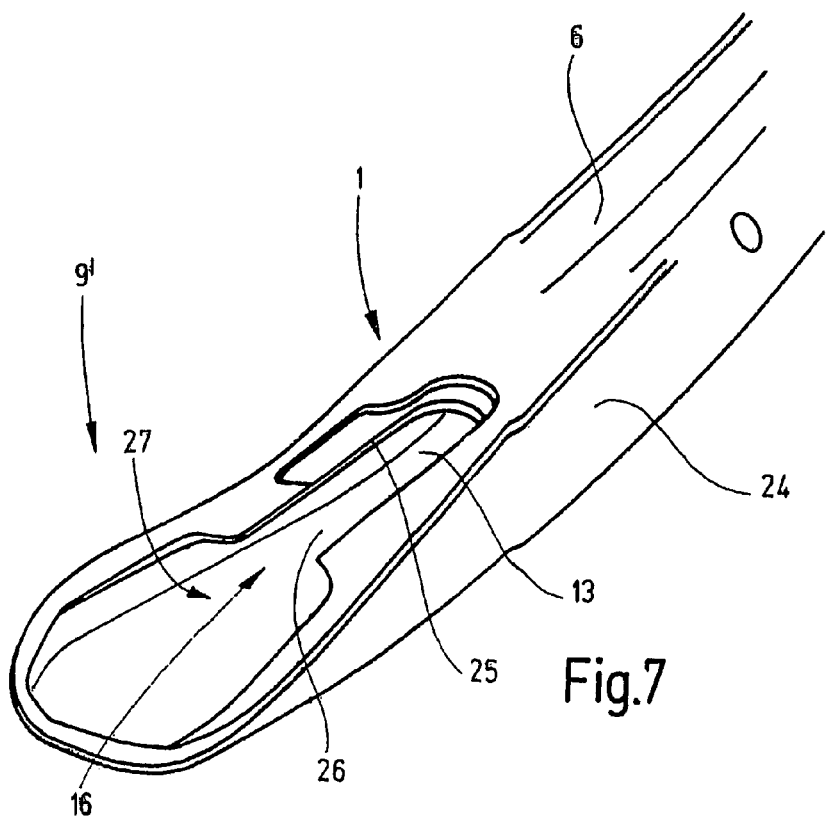

ROOF RACK SYSTEM FOR A MOTOR VEHICLE

FIELD

The invention relates to a roof rack system for a motor vehicle, specifically for a passenger car, having at least one roof rack which has an attaching device for attachment on the roof of the motor vehicle, where the attaching device uses at least one mounting bolt to pass through at least one roof opening.

BACKGROUND

Passenger cars can have a roof rack system on their roof in the form of a roof rack or a roof rail. These roof rack systems consist specifically of two retaining fixtures located parallel to one another, where under the present patent application a roof rack is understood to mean a system with feet at the lateral ends and, where required, center feet, that is to say, the system is located at a distance from the roof of the motor vehicle because of the end feet and the center feet. The roof rails mentioned refer to a system which does not have end feet and center feet, that is to say the roof rails run accordingly directly on the upper side of the roof of the vehicle. Cross bars can preferably be attached between the two roof rack elements or roof rail elements running spaced apart from each other to create additional support and carrying capacity for fastening a load on the roof of the motor vehicle.

Since a roof rack system of this type has to be attached to the roof of the motor vehicle, a connection is made by means of an attaching device to load-bearing parts in the roof of the vehicle. This is usually done while the vehicle is being manufactured, that is to say, the roof rack systems mentioned here are usually assigned to the motor vehicle from the start and are not removed when the vehicle is in use. The invention addresses such systems, but comprises also possible systems which can be installed or removed as required. In each case it is necessary to effect the attachment of the roof rack system to the vehicle roof with a fastening device which passes through the roof skin using mounting bolts and is connected to corresponding load-bearing roof parts. Piercing the roof skin carries the risk that moisture can penetrate into the vehicle roof.

SUMMARY

The object of the invention is, therefore, to specify a roof rack system of the type named initially which does not result in problems with moisture.

This object is achieved by a seal assigned to the mounting bolt, extending around the mounting bolt and, when the roof rack system is installed, resting on the roof and thereby surrounding the opening in the roof. This seal is thus assigned to the mounting bolt. This is understood to mean that it is located in a zone close to the mounting bolt, is not far removed from the mounting bolt and—starting from the mounting bolt—does not extend into an area which is far removed from the mounting bolt. This ensures that the seal always makes full contact and seals cleanly against the roof of the vehicle so that waviness or similar in the seal, which can result in the creation of gaps into which moisture, dirt and similar can find their way, is prevented. The seal extends around the mounting bolt so that a barrier is created on all sides where it surrounds the opening in the roof, that is, the opening in the roof of the vehicle is protected on all sides against external factors, specifically the entry of moisture, by the placement of the seal on the vehicle roof. The mounting bolt mentioned does not have to be a bolt with a circular cross-section, other mounting bolts with any cross-sectional profile can be used.

The seal is preferably an annular seal, that is, a closed ring exists where the ring can have any outline, thus it is possible for it to have a circular shape or to be configured oval or stadium-shaped. A polygonal shape is also conceivable, for example a square or rectangular shape.

A refinement of the invention provides for the seal to be assigned to a carrier plate through which the mounting bolt passes. The carrier plate lends the seal rigidity, that is, it forms a retaining unit for the seal so that the seal assumes a desired position relative to the mounting bolt and maintains said position.

The carrier plate preferably has a bolt opening through which the mounting bolt passes. Consequently, the mounting bolt passes through the bolt opening so that the carrier plate can be regarded as a form of washer on which the seal which coacts with the roof skin of the vehicle is located.

The carrier plate is configured specifically as a sheet metal plate, preferably as stainless steel plate. Manufacture is particularly simple if the support plate is configured as a stamped sheet part.

The seal is preferably located on the underside of the support plate, specifically in a circumferential edge zone of the support plate, where any type of fastening may be selected to hold the seal to the support plate. It is possible, for example, to bond the seal to the support plate. The seal can also be snapped onto the support plate, for example, by the seal having a groove which enfolds the edge of the support plate. Other possible means of locking or attachment can be implemented.

The support plate is preferably located non-displaceably on the mounting bolt or displaceable axially only in a displacement zone. The result is that it is cannot be lost from the mounting bolt so that no special care needs to be exercised during assembly operations since the carrier plate cannot slip off the mounting bolt. The axial location of the carrier plate on the mounting bolt results in it assuming a specific position relative to the carrier bolt which is desirable.

The location of the carrier plate on the mounting bolt can preferably be achieved by means of a thickening in the cross-section of the mounting bolt. The thickening in the cross-section is greater than the diameter of the bolt opening so that axial retention is provided. The thickening in the cross-section can be achieved by means of a separate collar element located on the shank of the mounting bolt or the thickening in the cross-section is formed in one piece on the mounting bolt, achieved, for example, by upsetting. In the case of the mounting bolt, it is preferably a stud bolt, specifically a threaded stud bolt.

The mounting bolt specifically has a retaining element which is attached or can be attached to the roof rack. In particular, it is intended that the retaining element is a slot nut which is inserted into a corresponding groove on the roof rack rail. Areas of the groove which form a retaining zone are thereby gripped from behind by the slot nut so that the threaded bolt is located axially. The mounting bolt can be attached specifically by means of a thread to the retaining element. It is advantageous if the mounting bolt has a thread in one of its end areas which is screwed into a threaded hole of the slot nut. The other end area of the mounting bolt preferably also has a thread onto which a nut element can be screwed to attach the roof rack or the roof rail on the vehicle roof, that is, the nut element bears against the roof load-bearing construction of the vehicle, whereby the roof rack system is secured in the direction of the mounting bolt where it rests with such force against the outer skin of the roof that the body panel forming the outer roof skin is not unacceptably deformed. The roof rack system is thus attached by means of the mounting bolts to the roof load-bearing system of the vehicle with the required force, while the contact of the underside of the roof rack system against the roof skin is of a lower force in order not to cause any deformation of the panel of the vehicle roof, where the seal in accordance with the invention still has to exert sufficient pressure to prevent the entry of moisture and the like.

Particular provision can be made for the outline of the carrier plate to be larger than the surface area of the holding element with which the latter bears directly or indirectly against the carrier plate. If it bears directly, the retaining element lies directly against the carrier plate. If it bears indirectly, this is understood to mean that at least one additional element is located between retaining element and carrier plate, for example a supplementary seal, specifically in the form of a plastic film seal, which will be discussed in more detail hereinafter. Since the outline of the carrier plate is larger than the contact area of the retaining element, the seal, which is preferably located in the circumferential edge zone of the carrier plate or extends to this point, lies at a certain distance from the shank of the mounting bolt and, if necessary, also at a radial distance from the area contacted by the retaining element (or offset to the latter), with the result that the carrier plate itself can develop the characteristic of a spring. When the roof rack system is tightened on the vehicle roof, crushing of the gasket is prevented because the force with which the retaining element is braced against the load-bearing construction of the roof is absorbed by the collar element of the mounting bolt and/or by the underside of the carrier plate, not transferred in full to the seal. In addition, the carrier plate can shift axially in its edge zone because of its elasticity. The seal, or areas of the seal are also located there, with the result that reduced forces are in effect here, but which are still sufficiently high to provide protection against the entry of moisture.

In the assembled state, the slot nut bears directly against the top side of the carrier plate, that is, there is direct contact between the two elements or indirect contact, that is, there is an intermediate element, specifically the supplementary seal that was mentioned previously. The supplementary seal is preferably attached to the top side of the carrier plate, specifically bonded there or sprayed on.

The supplementary seal can also be configured as an annular seal, a supplementary annular seal. It can be located at the circumferential edge zone of the carrier plate, specifically on its upper side. The supplementary seal can, however, be alternatively configured specifically as a plastic film seal, preferably a plastic film seal over the entire surface of the carrier plate.

Seal and supplementary seal form separate seals. Alternatively, it is also possible that the seal and the supplementary seal form a joint seal. This is particularly conceivable when the joint seal enfolds the lateral edge of the carrier plate so that an annular seal from the joint seal is configured on the underside and on the top side of the carrier plate. One annular seal coacts with the retaining element and the other annular seal with the roof skin.

Particular provision is made for the retaining element to have an annular depression on the side facing the carrier plate which runs around the mounting bolt and in which the supplementary seal lies or is attached there in such a way that in the relaxed state it projects beyond the side of the retaining element facing the carrier plate. When a force is transferred to the carrier plate by the retaining element, particularly by the slot nut, while tightening the roof rack system on the vehicle roof, the supplementary seal is pressed back in the annular depression as a result and to this extent achieves a sealing effect. The supplementary seal is protected from being crushed because of its recessed position in the annular indentation.

To attach the retaining element, it is advantageous if it is configured as a slot nut and is inserted into a locating groove in the roof rack. In what preceded and in what follows, mention is made mostly only of one mounting bolt and one retaining element, specifically slot nut, and one locating groove and so on. Preferably the attaching device to locate the roof rack system on the roof has several mounting bolts and so on. They are distributed spaced apart along the longitudinal extent of the roof rack, or roof rail, for example four mounting bolts are provided, where two are located in the end areas and two additional bolts are located between these two, where the mounting bolts are at approximately the same distance from each other.

To close a gap between the underside of the roof rack and the roof skin an elastic underlayer is preferably provided. It can be fastened to the underside of the roof rack, for example bonded there. The arrangement is preferably made such that the thickness of the seal and/or the supplementary seal is greater than the thickness of the flexible underlayer. This means that the seal has a greater thickness than the underlayer or that the supplementary seal has a greater thickness than the underlayer or that the total of the thickness of the seal and of the supplementary seal is greater than the thickness of the flexible underlayer. This always ensures that during assembly the seal or the supplementary seal "anticipates" with respect to making contact, that is, it is already touching the roof skin when no tightening has yet taken place, when the underlayer has not yet been correspondingly clamped against the roof skin by drawing down the attaching device. This ensures that the seal in accordance with the invention and/or supplementary seal can always exercise their sealing function correctly and that any potential minor corrugation or similar in the underlayer does not result in moisture leaks at the attaching device.

As already mentioned, the roof rack can be configured as at least a roof railing or as a roof rack, where the roof rail is attached directly to the roof skin and the roof railing has foot braces and, if necessary, center feet. Specifically two roof railing elements, or two roof rail elements, are attached to each vehicle, where they run parallel to each other and are located on the left and right side areas of the roof, with their longitudinal extent running parallel to the longitudinal extent of the vehicle.

Finally, provision can be made for the seal and/or the supplementary seal and/or the elastic underlayer to consist of plastic, rubber or other, elastic, sealing, non-weathering materials, specifically of neoprene and/or sealing film.

BRIEF DESCRPTION OF THE DRAWINGS

Figure 2:
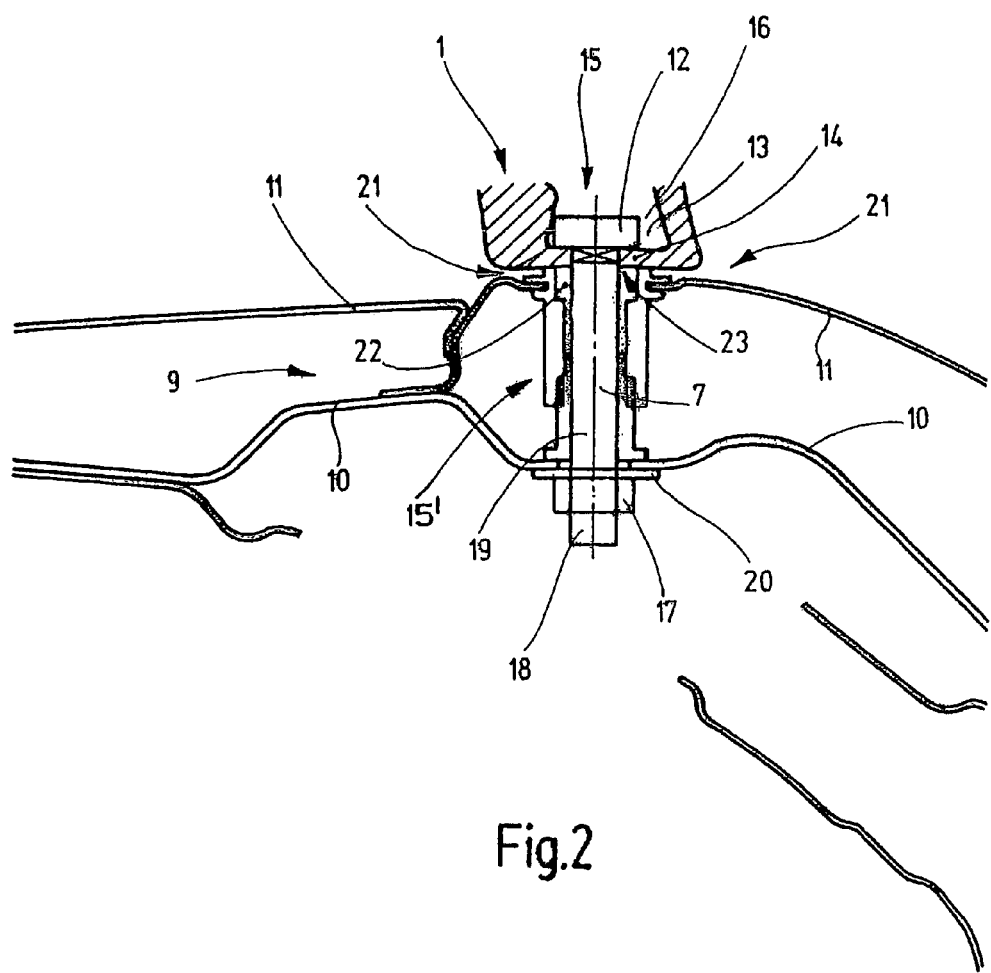
Figure 8:
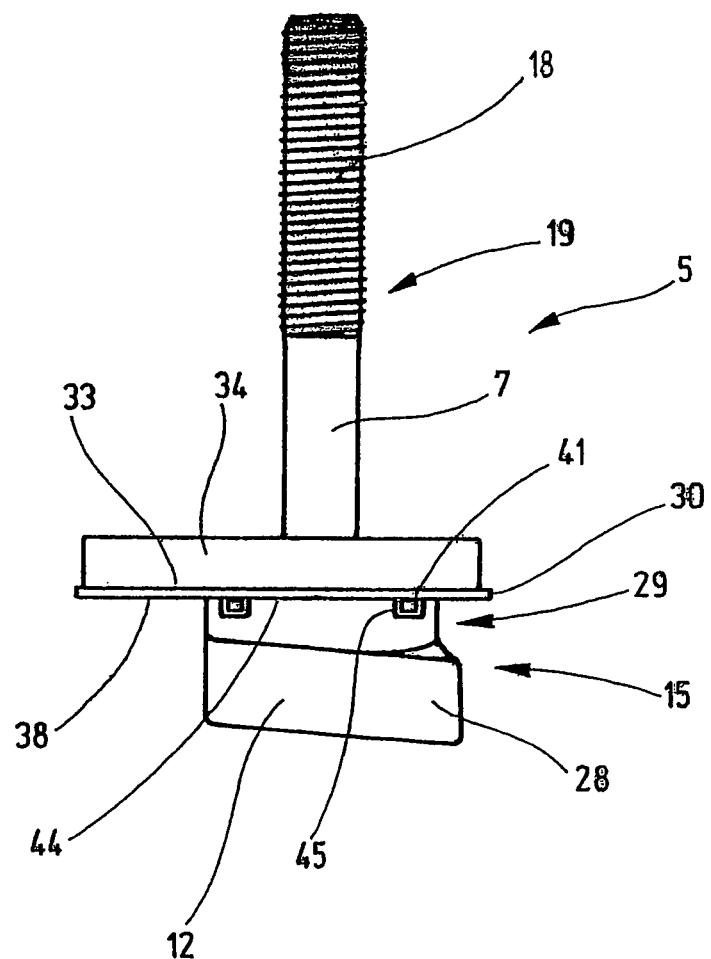

The drawings illustrate the invention using one embodiment as follows:

FIG. 1 shows a section of a vehicle with a roof rail of a roof rack system, with the roof rail in an interim stage during installation, FIG. 2 shows a cross-section through the vehicle roof showing part of a roof rail installed, FIG. 3 shows a perspective view underneath the end area of the roof rail in an interim stage of installation, FIG. 4 shows the representation from FIG. 3 in a pre-assembled state, partially cut away, FIG. 5 shows a side elevation of an attaching device for the roof rail, FIG. 6 shows a perspective view of the representation from FIG. 5, FIG. 7 shows the underside of the end area of the roof rail without attaching device and FIG. 8 shows a further embodiment of an attaching device.

DETAILED DESCRIPTION

FIG. 1 shows a roof rail of a roof rack system 2, which is assigned to the roof 3 of a partially shown passenger car 4. The roof rail 1 is configured as a one-piece roof rail. It is retained to the outside of the roof 3 by means of a fastening device 5.

FIG. 1 shows an intermediate installation stage in which the underside 6 of the roof rail 1 still maintains a distance to the outside of the passenger car 4 so that it can be seen that, distributed over its length, four mounting bolts 7 extend from the roof rail 1 which pass through roof openings 8 on the roof 3. Nut elements are threaded onto the ends of the mounting bolts 7 so that the roof rail 1 is solidly connected to a roof substructure and the underside 6 rests with light pressure on the outside of the roof 3 without unacceptable deformation of the roof skin, which is painted sheet metal. The gap between the roof rail 1 and the roof 3, which can be seen in FIG. 1, is no longer present in the final assembled state. It can be seen from FIG. 1 that the end areas 9', 10' of the one-piece, hollow-profile roof rail 1 run slightly arcuate as the cross-section of the roof rail 1 diminishes so that an aesthetic design results which is aerodynamically positive for airflow. Preferably two roof rails 1 are mounted on the roof 3 of the passenger car 4, one each in one of the two side areas of the roof.

FIG. 2 clarifies the roof substructure 9 which has a carrier plate 10 which runs below the roof skin. Only one area of the roof rail 1 is shown in FIG. 2. It can be seen that a retaining element 12 is located in the interior of a support 13 in the roof rail 1, where a retaining zone 14 in the roof rail 1 is gripped from behind by the retaining element 12. The retaining element 12 is connected to the mounting bolt 7 which rides in a guide 15' which is located between the roof skin 11 and the carrier plate 10. The retaining element 12 is preferably configured as a slot nut 15, where the support 13 forms a locating groove 16 into which the slot nut 15 is inserted in the axial direction of the roof rail 1. By means of a nut element 17 which is screwed onto a threaded section 18 of the shank 19 of the mounting bolt 7 with the interposition of a washer 20, the roof rail 1 is fastened to the carrier plate 10 of the roof substructure 9, where the guide 15' is interposed to absorb tensioning force and additionally forms a spacer between the roof skin 11 and the carrier plate 10. Consequently, the full axial tensioning force of the mounting bolt is exerted only on the roof rail 1, not on the easily deformable roof skin 11 consisting of painted sheet metal.

In order to ensure that no moisture or dirt can enter into the roof opening 22 through which the mounting bolt passes, as indicated by the two arrows 21, at least one seal is provided in the location to which arrow 23 points in FIG. 2, which is not clear from FIG. 2 but is shown in FIGS. 3 to 6 and in FIG. 8.

FIG. 7 shows the underside 6 of the roof rail 1 in the area of the end 9'. The roof rail 1 is manufactured as a hollow profile 24, preferably using an extrusion process, having a dividing wall 25 in the interior so that the support 13, which forms a retaining groove 16, is formed below the dividing wall 25 and the inside of the outer wall 26. The retaining groove 16 becomes wider towards the end of the roof rail so that a guide opening 27 is created. The attaching device 5 from FIG. 5 can be attached to create moveable stud bolts on the roof rail 1, where the attaching device 5 serves to attach the roof rail 1 to the roof 3 of the passenger car 4.

The attaching device 5 has, in accordance with FIGS. 5 and 6, the mounting bolt 7 with an end threaded section 18. Further, the opposite end of the mounting bolt 7 is also provided with a thread which is screwed into a threaded hole in the retaining element 12. The retaining element 12 is configured as a contoured slot nut 15 which has a head 28 and a thinner waist. A carrier plate 30 consisting of spring steel plate is pushed onto the shank 19 of the mounting bolt 7 such that it comes into contact with the underside of the waist 29 of the slot nut 15. For axial location of the carrier plate 30 on the mounting bolt 7, the latter has a one-piece, upset collar 31 in accordance with FIG. 6 so that the carrier plate 30 cannot be lost and is located axially, substantially immovably on the shank 19, but is not located so tightly that relative rotation between the carrier plate 30 and the mounting bolt 7 is no longer possible. For the mounting bolt 7 to pass through the carrier plate 30, the latter is provided with a bolt opening 32 which is not visible in FIG. 6 since it is covered by the collar 31.

The previously mentioned seal 34 is attached to the underside 33 of the carrier plate 30, specifically bonded there, where the seal 34 is configured as an annular seal 35 and consists of an elastic sealing material, specifically neoprene. From FIG. 6 it can be seen that the outline of the carrier plate 30 is stadium-shaped so that the seal 34 has a corresponding stadium shape but because of its annular shape it is located only in a circumferential edge zone 36 of the carrier plate 30. It can be further seen from FIG. 6 that because of its annular shape, the seal 34 maintains a distance from the shank 19 of the mounting bolt 7 on all sides.

To locate the attaching device 5 to the roof rail 1, the slot nut 15—in accordance with FIG. 3—is inserted axially with its head 18 into the locating groove 16—beginning at the guide opening 27—so that it assumes the position in accordance with FIG. 3. The waist 29 abuts the edge of the dividing wall 25 and the head engages behind the dividing wall 25 so that with axial tension on the mounting bolt 7 a sympathetic movement of the roof rail 1 ensues. To prevent the slot bolt 15 from slipping out of the locating groove 16 again during assembly operations, a locking element 37 is provided—in accordance with FIG. 4—which is inserted as an interference fit into the remaining part of the locating groove 16. It is possible, but not necessary, to fill any remaining empty spaces in the locating groove with filler material, for example silicone.

From FIGS. 3 and 4 it becomes clear that when the mounting bolt 7 is in the attached state on the roof rail 1, parts of the upper side 38 (FIG. 5) of the carrier plate 30 abut the underside 6 of the roof rail 1, and further the underside 44 of the waist 29 of the slot nut 15 also rests against a corresponding center area of the upper side 38 of the carrier plate 30.

In accordance with FIG. 4, an elastic underlayer 39 in the form of neoprene strips 39 can be attached to the underside 6 of the roof rail, specifically bonded there. The neoprene strip 39 is shown cut away at the end in FIG. 4 in order to be able to see the locking element 37. The neoprene strip 39 is discontinuous, and the carrier plate 30 with seal 34 lies at the point where it is interrupted 40 (FIG. 4), where the thickness of the seal 34 is somewhat greater than the thickness of the underlayer 39.

When the roof rail, fitted with mounting bolts 7 and seal array, is assembled to the roof 3 of the passenger car 4, the mounting bolts 7 are fed into the roof openings 8 and the roof rail 1 is lowered with its underside 6 towards the roof skin 11.

Then nut elements 17 are installed onto the threaded sections 18 with interposed washers 20 in accordance with FIG. 2. It becomes clear that when locating the roof rail, the seals 34 initially rest against the roof skin 11, running around the roof openings 8. During further tightening, each seal 34 is slightly compressed. During further bolting down, the underlayer 39 comes up against the roof skin 11 so that no gap remains between roof rail 1 and roof skin 11. The nut elements 17 are tightened such that the slot nut 15, with interposition of carrier plate 30 and optional collar element 31, pulls the roof rail 1 tight against the guide 15', where the seal 34 is compressed elastically with less force than the clamping force for the roof rail attachment. The correlations are such that the seal 34 is not too severely compressed so that long-term sealing is ensured.

As an alternative to the preceding, it is possible that a plastic film seal is located on the upper side 38 of the carrier plate 30 so that there is a seal between the underside 44 of the slot nut 15 and the carrier plate 30. Alternative provision can also be made for the film seal to be located on the underside 44 of the slot nut 15 or for both the carrier plate 30 and the slot nut 15 to have a suitable seal, specifically a film seal. A film seal or a corresponding seal is preferably used because such seals are insensitive to high pressure forces, but sealing is achieved nonetheless.

In accordance with FIG. 8, as distinct from the embodiment from FIG. 5, additional provision can be made in a further embodiment of an attaching device 5 for an additional annular depression 45 on the underside 44 of the slot nut 15 in which a supplementary annular seal 41 is located. Thus the seal 34 is assigned to the underside 33 of the carrier plate 30 and the supplementary seal 41, which is also configured as an annular seal and surrounds the shank 19 of the mounting bolt 7 in a ring shape, is assigned to the upper side 38 of the carrier plate 30. Additional sealing is ensured by this step so that no moisture from outside can reach the interior of the vehicle roof 3 along the shank 19 of the mounting bolt 7. It must be noted expressly here that the penetration of moisture is also precluded in the case of the embodiment from FIGS. 1 to 7. Due to the recessed position of the supplementary seal in accordance with FIG. 8 it is impossible for it to be crushed during tightening. In the relaxed state it has a thickness which is greater than the depth of the annular depression.

What is claimed is:

1. A roof rack system for a motor vehicle comprising:
a roof rack having an attaching device for location on the roof of the vehicle, the attaching device including:
at least one mounting bolt for passing through a roof opening;
a retaining element having the form of a slot nut for insertion in a locating groove of the at least one roof rack;
a seal extending around the mounting bolt and for resting on the roof and surrounding the roof opening when the roof rack is installed; and
a thin, metal carrier plate having a bolt opening through which the mounting bolt passes, the carrier plate located on the mounting bolt not axially displaceable or axially displaceable only in a displacement zone due to at least one thickening in a cross section of the mounting bolt, an underside of the carrier plate abutting the seal, an upper side of the thin, metal carrier plate abutting the roof rack, the seal bonded to the carrier plate;
wherein when the mounting bolt is in an attached state on the roof rack, a portion of an upper side of the carrier plate abuts an underside of the roof rack, and an underside of a waist of the slot nut rests against a corresponding area of the upper side of the carrier plate.

2. The roof rack system of claim 1, wherein the upper side of the carrier plate further abuts the mounting bolt.

3. The roof rack system of claim 1, wherein the attaching device is separable from the remainder of the at least one roof rack.

4. The roof rack system of claim 1, wherein the carrier plate abuts the seal and the rack is directly captured between the carrier plate and the waist of the slot nut.

5. A roof rack system for a motor vehicle comprising:
at least one roof rack having an attaching device for location on the roof of the vehicle, the attaching device including:
at least one mounting bolt for passing through at least one roof opening;
a retaining element having the form of a slot nut for insertion in a locating groove of the at least one roof rack;
a carrier plate having a bolt opening through which the mounting bolt passes, the carrier plate located on the mounting bolt not axially displaceable or axially displaceable only in a displacement zone due to at least one thickening in a cross-section of the mounting bolt; and
a seal extending around the mounting bolt and bonded to the carrier plate, resting on the roof and surrounding the roof opening when the roof rack is installed,
wherein when the mounting bolt is in an attached state on the roof rack, a portion of an upper side of the carrier plate abuts an underside of the roof rack, and an underside of a waist of the slot nut rests against a corresponding area of the upper side of the carrier plate.

6. The roof rack system of claim 5, further comprising a supplementary seal located between the slot nut and the carrier plate.

7. The roof rack system of claim 6, wherein the seal and the supplementary seal form a joint seal.

8. The roof rack system of claim 7, wherein the joint seal enfolds the lateral edge of the carrier plate so that a sealing ring is formed on an underside and an upper side of the carrier plate.

9. The roof rack system of claim 6, wherein the supplementary seal is bonded on an upper side of the carrier plate.

10. The roof rack system of claim 6, wherein the supplementary seal is a supplementary annular seal.

11. The roof rack system of claim 6, wherein the supplementary seal is a film seal.

12. The roof rack system of claim 6, wherein the supplementary seal is located on a circumferential edge zone of the carrier plate, specifically on its upper side.

13. The roof rack system of claim 6, further comprising an elastic underlayer proximate to the underside of the roof rack, wherein the thickness of at least one of the seal and the supplementary seal is greater than the thickness of the elastic underlayer.

14. The roof rack system of claim 6, further comprising an elastic underlayer proximate to the underside of the roof rack, wherein at least one of the seal, the supplementary seal and the elastic underlayer comprises at least one of neoprene and sealing film.

15. The roof rack system of claim 5, wherein the carrier plate is a sheet metal plate.

16. The roof rack system of claim 1, wherein the sheet metal plate is a stainless steel plate.

17. The roof rack system of claim 5, wherein the mounting bolt is a stud bolt.

18. The roof rack system of claim 17, wherein the stud bolt is a threaded stud bolt.

19. The roof rack system of claim 5, wherein the seal is an annular seal.

20. The roof rack system of claim 5, wherein the carrier plate is configured as a stamped sheet metal part.

21. The roof rack system of claim 5, wherein the seal is located on a circumferential edge zone of the carrier plate.

22. The roof rack system of claim 5, wherein the thickening in the cross-section is formed by a separate collar element carried by the mounting bolt.

23. The roof rack system of claim 5, wherein the surface area of the carrier plate is larger than the surface area of the retaining element with which the latter supports at least indirectly against the carrier plate.

24. The roof rack system of claim 5, wherein the retaining element has an annular depression on a side facing the carrier plate which runs around the mounting bolt and in which a supplementary seal lies or is attached there in such a way that in a relaxed state it projects beyond a side of the retaining element.

25. The roof rack system of claim 5, further comprising an elastic underlayer proximate to the underside of the roof rack.

26. The roof rack system of claim 5, wherein the roof rack is flush-mounted to a vehicle roof.

27. The roof rack system of claim 5, wherein the roof rack is a footed railing.

28. The roof rack system of claim 5, wherein the seal generally conforms in shape to the carrier plate.

29. The roof rack system of claim 5, wherein an upper side of the carrier plate abuts the at least one roof rack.

30. The roof rack system of claim 5, wherein the attaching device is separable from the remainder of the at least one roof rack.

31. The roof rack system of claim 5, wherein the carrier plate abuts the seal and the rack is directly captured between the carrier plate and the waist of the slot nut.

32. A roof rack system comprising:
a roof rack; and
an attachment device for securing the roof rack to a vehicle roof, the attachment device including:
at least one mounting bolt for passing through a roof opening;
a retaining element having the form of a slot nut for insertion in a locating groove of the at least one roof rack;
a seal extending around the mounting bolt and for resting on the roof and surrounding the roof opening when the roof rack is installed; and
a thin, metal carrier plate having a bolt opening through which the mounting bolt passes, the carrier plate located on the mounting bolt not axially displaceable or axially displaceable only in a displacement zone due to at least one thickening in a cross section of the mounting bolt, an underside of the carrier plate abutting the seal, an upper side of the thin, metal carrier plate abutting the roof rack, the seal bonded to the carrier plate;
wherein the attachment device is separable as a unit from the roof rack; and
wherein when the mounting bolt is in an attached state on the roof rack, a portion of an upper side of the carrier plate abuts an underside of the roof rack, and an underside of a waist of the slot nut rests against a corresponding area of the upper side of the carrier plate.

33. The roof rack system of claim 32, wherein the carrier plate abuts the seal and the rack is directly captured between the carrier plate and the waist of the slot nut.

* * * * *